April 30, 1957     W. R. PETERSON ET AL     2,790,605
WATER BY-PASS CONTROL FOR BUS HEATING SYSTEM
Filed Feb. 7, 1952     2 Sheets-Sheet 1
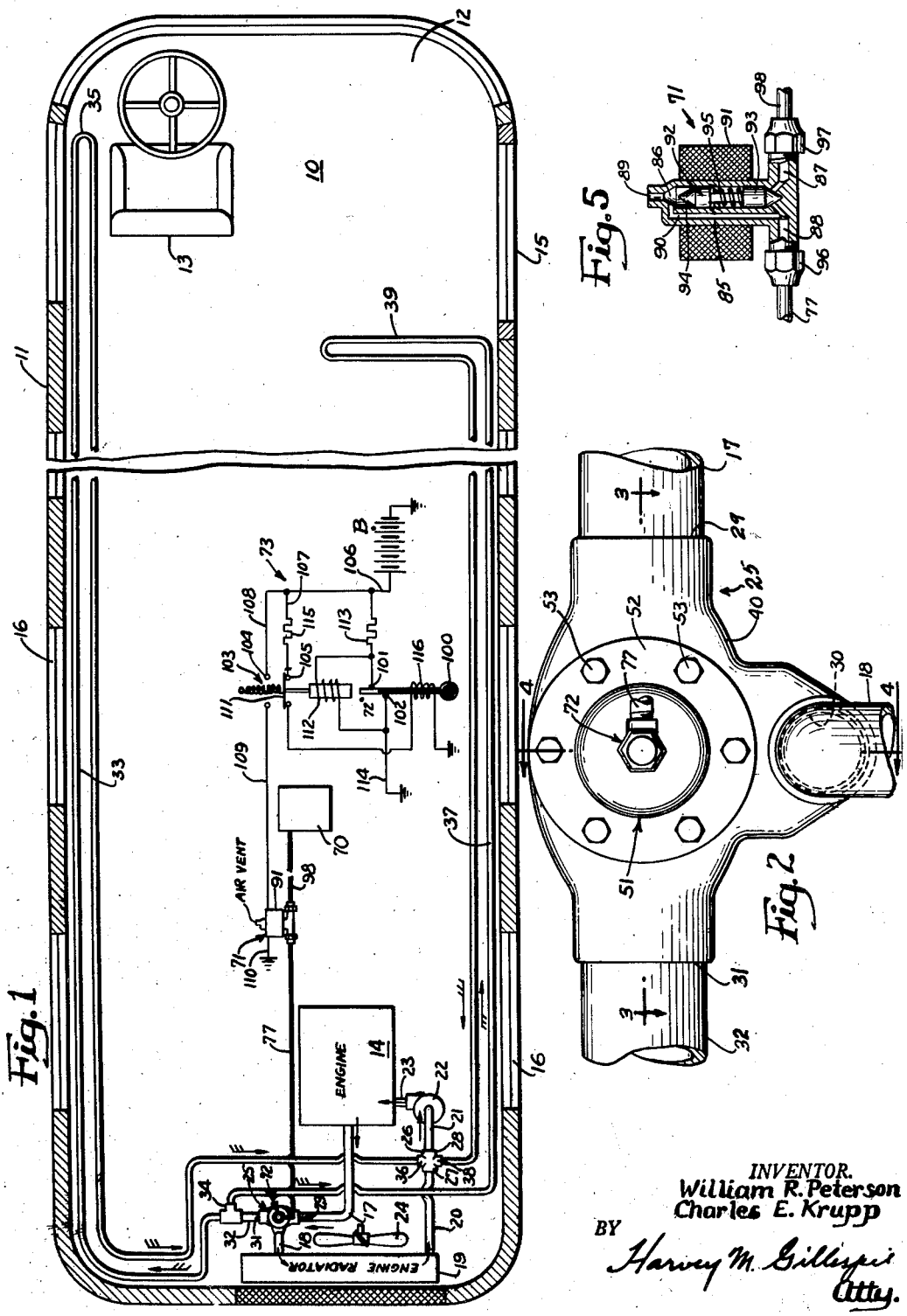
INVENTOR.
William R. Peterson
Charles E. Krupp
BY
Harvey M. Gillespie
Atty.

April 30, 1957 W. R. PETERSON ET AL 2,790,605
WATER BY-PASS CONTROL FOR BUS HEATING SYSTEM
Filed Feb. 7, 1952 2 Sheets-Sheet 2
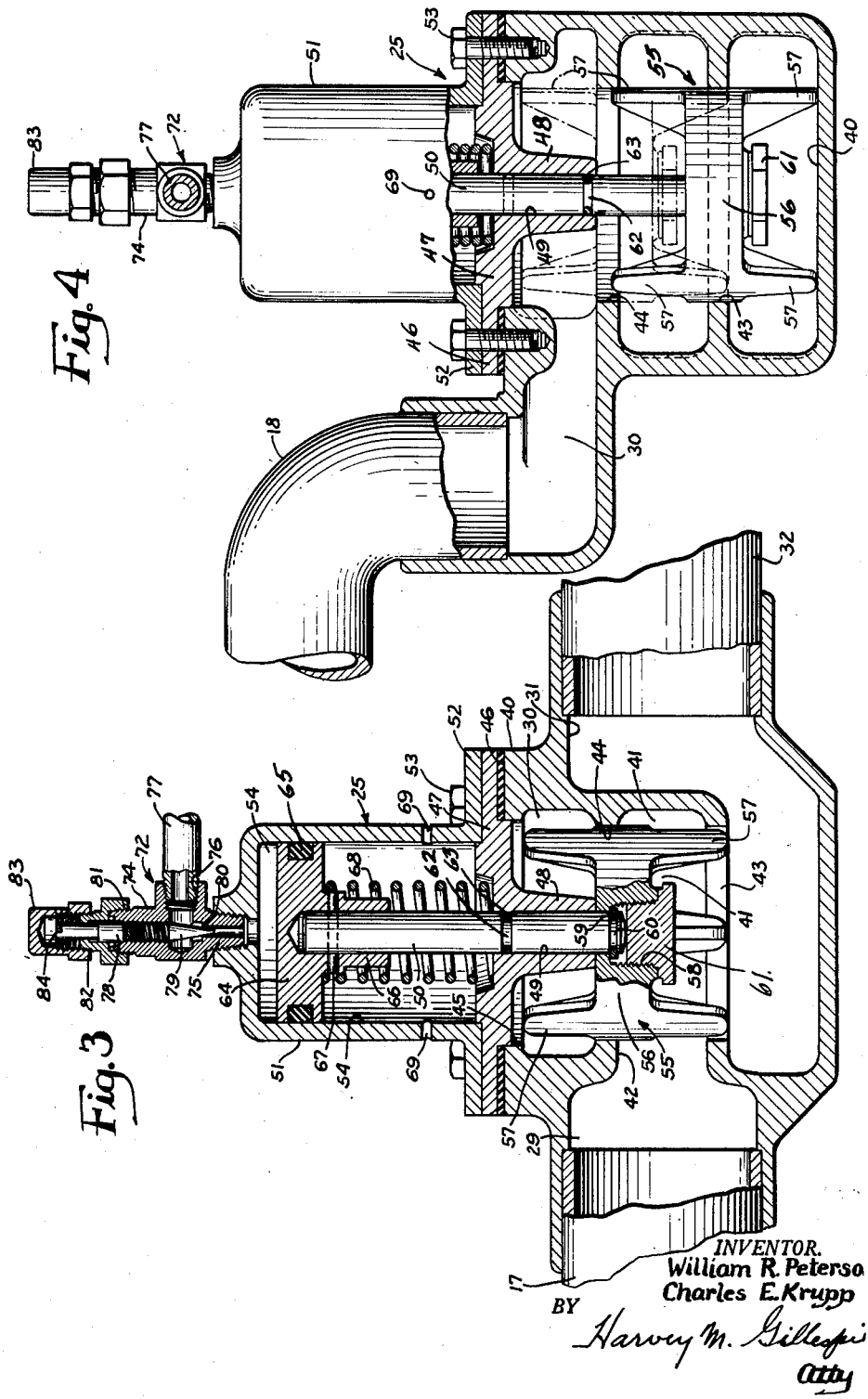
INVENTOR.
William R. Peterson
Charles E. Krupp
BY
Harvey M. Gillespie
Atty

2,790,605

WATER BY-PASS CONTROL FOR BUS HEATING SYSTEM

William R. Peterson, Oaklawn, and Charles E. Krupp, Evanston, Ill., assignors to Vapor Heating Corporation, Chicago, Ill., a corporation of Delaware Application February 7, 1952, Serial No. 270,446

8 Claims. (Cl. 237—8)

The invention relates to a heating and temperature regulating system for an engine powered vehicle, for example a vehicle for transportation of passengers in groups.

Many heating and temperature regulating systems now used in passenger vehicles of the above character are such as to quickly reflect the relatively sudden but temporary changes in temperature resulting from frequent or infrequent opening of the door or doors of the vehicle for the admission or discharge of passengers and therefore result in effecting unnecessary adjustments to the heating and/or cooling means of the vehicle.

The present invention is designed to overcome the above and other objections to the conventional heating systems now in general use and, toward this end, it contemplates the provision, in a heating and temperature regulating system for vehicles such as buses and individual railway cars which are powered by an internal combustion engine having a lquid coolant circulatory system, of improved means including a pressure actuated control valve capable of selective operation to direct all or a portion only of said liquid through heat radiating coils located within the passenger space of the vehicle. The pressure operated valve is air operated, which is to say it may be operated from a source of compressed air such as is ordinarily available in such vehicles for operation of the vehicle brakes and other auxiliary equipment, and the application of air under pressure thereto is effected under the control of a thermostat through an electrically actuated directional valve and a retarding device, the latter of which retards the flow of air into and out of the pressure operated valve.

The retarding device herein shown is a valve of the bleeder type, which may be manually set to admit air under pressure at a relatively slow rate to the pressure operated mechanism for operating the control valve. Conversely this retarder valve also operates to bleed air at operating pressures from the pressure chamber of the pressure operated valve at a relatively slow rate. The pressure operated control valve is of the directional type and normally assumes a position wherein coolant liquid issuing from the water jacket or other portion of the circulatory system of the engine is directed through piping loops which constitute the heat radiators within the passenger compartment of the vehicle. Said coolant liquid is thus wholly or partially by-passed around the engine cooling radiator and delivered directly from the engine into the heat radiators within the passenger space of the vehicle. Upon admission of air to the pressure chamber of the pressure operated control valve, the valve body proper is moved slowly from its seat and caused to gradually open a port whereby liquid issuing from the water jacket is directed into the engine cooling radiator and proportionally reduces the volume of said liquid delivered to the heat radiating loops within the passenger space of the vehicle. In the limiting position of the valve body, substantially all of the liquid issuing from the engine jacket is delivered to the engine cooling radiator while the heat radiating loop within the passenger compartment of the vehicle no longer receives said liquid for heat exchange purposes.

The admission of compressed air through the retarder device to the pressure operated mechanism of the pressure operated valve is controlled by means of a solenoid actuated valve which may be of more or less conventional type and which when its solenoid is de-energized operates to prevent the supply of air under pressure to the pressure operated valve. When the solenoid of the air supply valve becomes energized, the valve operates to admit air under pressure through the retarding device to the pressure chamber of the pressure operated valve, thus urging the valve body in a direction whereby increasing increments of coolant liquid will flow from the engine to the engine cooling radiator while decreasing increments will flow to the heat radiators within the passenger compartment of the vehicle.

The air supply valve is operable under the control of a thermostat located within the passenger compartment at a region which is more nearly typical of the overall temperature of the compartment. The thermostat has direct control of a relay which in turn controls the operation of the air supply valve.

The thermostat is provided with an auxiliary heater which is connected through said relay and is operable to recurrently apply heat to and remove it from the thermostat and thereby cause the thermostat to cycle by recurrently closing and opening its contacts at spaced intervals. This cycling of the thermostat will continue until the overall temperature within the vehicle is sufficient to maintain the thermostat closed.

The provision of a temperature regulating and heating system of the character briefly outlined above being the principal object of the invention, a further object is to provide a novel control valve by means of which fluid issuing from the circulatory cooling system of an internal combustion engine may selectively be directed to the engine cooling radiator of the vehicle or to the heating coils of the vehicle compartment and which is capable of control within very fine limits to apportion the required quantities of the heated liquid in a desired manner.

With the above and other objects in view, which will become more readily apparent as the nature of the invention is better understood, the invention consists in the novel construction, combination, and arrangement of parts shown in the accompanying drawings wherein:

Fig. 1 is a schematic plan view partly in section of a heating and temperature regulating system constructed in accordance with the principles of the present invention and showing the same operatively installed in a mobile passenger bus;

Fig. 2 is a fragmentary top plan view of a pressure operated valve employed in connection with the present invention and showing the same operatively connected in the system;

Fig. 3 is a sectional view taken substantially along the line 3—3 of Fig. 2;

Fig. 4 is a sectional view taken substantially along the line 4—4 of Fig. 2. In this view the valve parts are shown in a different position; and Fig. 5 is a sectional view taken through an air supply valve employed in connection with the present invention.

Referring now to the drawings in detail and in particular to Fig. 1, the invention is shown applied to a passenger bus or vehicle 10, the outlines of which have been illustrated and which includes a body 11, providing an enclosure 12 whose temperature is to be controlled. The vehicle 10 as shown is a highway bus of the rear engine type in which the driver's seat 13 is located adjacent the front left-hand corner of the bus with the vehicle engine 14 being positioned at the rear of the bus. The illustration of Fig. 1 is purely schematic and as a consequence many details of the bus per se have been omitted. The vehicle may be provided with one or more passenger entrances or exits, one of which is designated at 15 and is in the form of a door, while the requisite number of windows 16 may be provided at appropriately spaced positions along the sides of the vehicle.

The engine 14 is of the internal combustion type and utilizes a circulatory liquid cooling system including a closed fluid circuit leading from the water jacket of the engine through conduit sections 17 and 18, the usual engine radiator 19, conduit sections 20 and 21, water pump 22 and conduit section 23, back to the water jacket of the engine 14. A conventional cooling fan 24 is provided in the immediate vicinity of the radiator 19 for the purpose of impelling cooling air through the latter in heat exchange relationship with the cooling fins of the radiator 19.

According to the present invention a pressure operated control valve 25, the nature and function of which will be set forth presently, is interposed between the conduit sections 17 and 18 and a four-way fitting 26 has branches 27 and 28 in communication with the conduit sections 20 and 21 respectively. From the above description, it will be seen that when the control valve 25 is adjusted so that communication is established therethrough between the conduit sections 17 and 18, the liquid cooling circuit for the engine 14 previously described is established with the cooling liquid circulating in the direction indicated by the unfeathered arrows.

The control valve 25 and four-way fitting 26 previously described, constitute a part of the present heating system. The valve 25 is of the so-called three-way type and is provided with a liquid inlet 29 (see also Figs. 2, 3 and 4) in communication with the conduit 17. The valve also is provided with a pair of liquid outlets 30 and 31 in communication with the conduit 18 and with a conduit section 32, respectively, the latter forming part of a closed dual heating loop or circuit which extends lengthwise of the passenger compartment of the vehicle. The dual heating loop just referred to may assume various forms, but in the illustrated form thereof it includes a heating loop 33 in the form of an elongated conduit one end of which communicates with the conduit section 32 through a T-fitting 34 which extends along the left-side of the vehicle within the compartment 12. The heating loop 33 is reversed upon itself as at 35 adjacent the driver's location and the other end thereof communicates with a branch 36 of the four-way fitting 26. A second and similar heating loop 37 is arranged in hydraulic parallel with the heating loop 33 and has one end thereof communicating with the T-fitting 34 and the other end thereof communicating with a branch 38 of the four-way fitting 26. The heating loop 37 extends along the right side of the compartment 12 adjacent the side wall thereof and is turned inwardly at 39.

The control valve 25, when the enclosure of the vehicle is below a predetermined minimum temperature, serves to prevent communication between the conduit sections 17 and 18 and thereby directs all of the liquid issuing from the engine through the heating loops 33 and 37 in the direction indicated by the feathered arrows, the liquid being returned to the engine 14 through the conduit section 21 and pump 22.

Referring now to Figs. 2, 3 and 4, the control valve 25 involves in its general organization a body or casing 40 providing an internal valve chamber 41 having an inlet port 42 communicating with the valve body fluid inlet 29, an outlet port 43 in communication with the valve body fluid outlet 31, and an outlet port 44 communicating with the valve body liquid outlet 30.

The valve body 40 is provided with a circular opening 45 in the upper regions thereof providing a rim portion 46 upon which there is adapted to be seated a valve stem supporting and guiding member or plate 47 of generally circular design having a central hub portion 48 providing a valve stem guideway 49 therethrough in which there is slidably disposed a valve stem 50. A bell housing 51 of relatively deep inverted cup-shaped design is provided with an annular rim 52 which is positioned upon the peripheral regions of the guide plate 47. A sealing gasket is interposed between the guide plate 47 and rim portion 46 of the valve body 40 and a series of cap screws 53 serve to secure the various parts in position as clearly shown in Figs. 3 and 4.

The bell housing 51, in combination with the valve stem guide plate 47, provides an internal pressure chamber or cylinder 54 into which the upper end of the valve stem 50 projects. The lower end of the valve stem 50 projects through the hub portion 48 of the plate 47 and has mounted thereon the valve proper 55 which is generally in the form of a spider-like element having a central hub portion 56 from which extends on opposite sides thereof a plurality of oppositely facing circumferentially spaced fingers 57.

In order to secure the valve member 55 to the lower end of the valve stem 50, a threaded recess 58 is formed in the under side of the hub portion 56. The lower end of the valve stem 50 projects through the hub 56 and into the recess 58 and a split snap ring 59 fitted in an annular groove 60 provided near the extreme lower end of the stem 50 bears against the base of the socket 58 to support or suspend the valve member 55 from the lower end of the stem. A threaded cap 61 is received in the recess 58 and constitutes a sealing member to prevent passage of liquid through the otherwise imperforate hub 56 in the regions of its attachment to the valve stem 50.

From the above description it will be seen that the valve proper 55 is slidably movable from the extreme position in which it is shown in Fig. 3 to the extreme position in which it is shown in Fig. 4. In the former instance, the valve member 55 assumes an elevated position wherein the upwardly extending fingers 57 thereof bear against the under surface of the guide plate 47 and in the latter instance the valve element assumes a lowered position wherein the downwardly extending fingers 57 bear against the bottom wall of the valve body 40.

In the position of the valve shown in Fig. 3, liquid entering the inlet port 42 from the valve body inlet 29 and conduit section 17 may pass through the interstices existing between the downwardly extending fingers 57 and enter the port 43 and liquid outlet 31 and pass to the conduit section 32, thus establishing communication between the conduit sections 17 and 32. With the valve in this position, liquid is prevented from passing through the outlet port 44 so that communication between the conduit sections 17 and 18 is effectively blocked. The condition of valve 25 as a whole is such that coolant liquid issuing from the engine 14 is conducted for heating purposes through the circulating loops 33 and 37 in a manner previously described for heating purposes.

With the control valve 25 in the position shown in Fig. 4, liquid entering the valve body through the inlet port 42 may pass between the upwardly projecting fingers 57 and through the outlet port 44 and into the conduit section 18. In this position of the valve member, the hub portion 56 thereof effectively closes the outlet port 43 so that communication between the conduit sections 17 and 32 is prevented. In this condition of the control valve, coolant liquid issuing from the engine 14 is directed to the radiator 19 for cooling and recirculation through the engine.

The valve stem 50 is provided with a medial annular groove 62 in which a suitable sealing ring 63 is disposed for preventing egress of fluid from the valve chamber 41 to the pressure chamber or cylinder 54 and for preventing leakage of air in the other direction into the valve chamber.

The upper end of the valve stem 50 has mounted thereon a piston 64 provided with a peripheral sealing ring 65 and having a hub portion 66 through which a taper pin 67 may extend for securing the piston to the stem 50. A coil spring 68 surrounds the stem 50 and hub 66 and bears at its lower end against the plate 47 and at its upper end against the body of the piston 64 to normally urge the piston and consequently the valve stem 50 and valve proper 55 to the uppermost positions of which they are capable of assuming. The valve member 55 is thus normally maintained in the extreme position shown in Fig. 3. A plurality of air vents 69 are provided in the bell housing 51 to relieve the pressure of air in the housing beneath the piston 64.

Referring again to Fig. 1, air for operating the valve 25 is adapted to be delivered to the valve from a suitable source 70 of air under pressure under the control of an air supply valve 71 through a retarding valve 72. The air supply valve 71 is of the solenoid-actuated type and is operable under the control of a thermostat assembly 73.

The retarding valve 72 is in the form of a relatively small needle valve unit comprising a casing 74, having an outlet nipple 75 (Fig. 3) threadedly received in the upper end of the bell housing 51 and in communication with the interior thereof. The casing 74 is provided with a threaded inlet opening 76 which receives one threaded end of an air supply conduit 77 leading from the air supply valve 71. A valve stem 78 threaded in a portion of the casing 74 is provided with a conical needle valve body 79 which cooperates with a valve seat 80 in the usual manner of such valves to restrict the flow of air issuing from the inlet opening 76 and passing through the nipple 75 to the interior of the pressure chamber 54 of the control valve 25. A sealing cap 81 surrounds the valve stem 78 and is threadedly received on the valve body 74. The sealing cap 81 is provided with a threaded reduced portion 82 designed for reception thereover of a protective cap 83. The end of the valve stem 78 may be slotted as at 84 to facilitate adjustment thereof by a suitable tool such as a screw driver. From the above description it will be seen that the position of the valve stem 78 may be adjusted to retard the flow of air from the conduit 77 into the pressure chamber 54 so that the building up of pressure in the latter chamber to operate the piston 64 will be gradual, thus preventing sudden movements of the piston 64 and consequently of the valve member 55.

Referring now to Figs. 1 and 5, the air supply valve 71 may be of more or less conventional design and includes a non-magnetic body portion 85 providing an internal chamber 86 having an inlet passage 87 and an outlet passage 88 in communication with the chamber 86 adjacent one end thereof. A bleeder passage 89 communicates with the chamber 86 adjacent the other end thereof. A by-pass 90 communicates at one end with the outlet passage 88 and at the other end with the chamber 86 adjacent the bleeder passage 89. The body portion 85 of the valve 71 may be formed of brass or other similar non-magnetic material and a solenoid coil 91 surrounds the casing 85 and is secured thereto. A valve member 92 formed of magnetizable material such as steel is slidably disposed within the chamber 86 and has an end 93 designed for blocking commuication between the air inlet 87 and the air outlet 88 when the valve is in one position. The other end 94 of the valve member 92 is adapted to seal off the by-pass 90 and vent passage 89 when the valve member 92 is in its other extreme position. A coil spring 95 normally urges the valve member 92 to the position shown in Fig. 5 wherein the valve passages 87 and 88 are closed and wherein communication between the by-pass 90 and bleeder passage 89 is established. The valve member 92, in addition to performing its valve function, also constitutes the movable core of the solenoid coil 91 and the disposition of this coil is such that upon energization thereof the valve member 92 is moved to its extreme position wherein communication is established between the passages 87 and 88 and wherein the by-pass 90 and vent passage 89 are sealed.

The fluid passage 88 is operatively connected to the air supply conduit 77 by means of a threaded cap fitting 96 and the fluid passage 87 is similarly connected by a threaded cap fitting 97 to a conduit 98 leading to the source 70 of air under pressure.

The thermostat assembly 73 includes a thermostat 100 which is responsive to the temperature within the vehicle enclosure 12. The thermostat is of the mercury column type provided with spaced contacts 101 and 102 capable of being bridged by the mercury column at a predetermined temperature, for example 72° F. A relay 103 includes a pair of contacts 104 and a pair of contacts 105; the former contact being disposed in the solenoid energizing circuit which leads from ground through the battery B and through conductors 106, 107 and 108, bridged contacts 104, conductor 109, solenoid 91, and conductor 110 to ground.

When the temperature at the thermostat is below its temperature setting, the relay solenoid 113 is energized to open relay contact 104 and consequently de-energize coil 91 of the air supply valve 71, whereby the member 93 of the air supply valve 71 effectively blocks the valve passages 87 and 88 while at the same time the end portion 92 of the air supply valve 91 permits venting of air from the pressure chamber 54 of the control valve 25 through the retarding valve 72, conduit 77, by-pass 90 and vent passage 89 to atmosphere. The liquid control valve 25 is thus maintained in the condition wherein it is illustrated in Fig. 3 so that liquid issuing from the engine will be circulated through the heating loops 33 and 37 in the manner previously described. The closing of relay contacts 105 establishes an energizing circuit for the auxiliary heater 116 to apply heat to the thermostat. The circuit includes the battery B, leads 106, 107, limit resistor 115, bridged contacts 105, heater coil 116 and thence to ground.

Whenever the thermostat bridges its contacts the relay is de-energized to move the bridge arm 111 away from contact 105 and into engagement with contact 104. The circuit leads from the ground through battery B, conductors 106, current limiting resistor 113, thermostat contacts 101, 102, and conductor 114 to ground.

By recurrent closing and opening of contacts 105, the heater 116 functions to recurrently apply auxiliary heat to and remove it from the thermostat 100. The heater 116 is constructed to add sufficient auxiliary heat to the thermostat to raise its temperature 2° F. Therefore, if it is assumed that the overall temperature within the compartment 12 is considerably below the predetermined normal of 72° F. at which it is desired to maintain the compartment, the height of the mercury column will be insufficient to bridge the contacts 101 and 102 and thus the previously described circuit existing through the solenoid coil 112 will become effective. Such energization of the solenoid 112 will move the bridging arm 111 to a position wherein the contacts 104 become open and the contacts 105 become closed.

Opening of the contacts 104 will cause the solenoid 91 associated with the air supply valve 71 to remain de-energized so that the core 92 of air supply valve 71 will remain in the position shown in Fig. 5 under the influence of the spring 95, thus preventing air under pressure from entering the conduit 77 leading to the pressure operated control valve 25. As a consequence the spring 68 associated with the control valve 25 will maintain the valve member 55 in the position shown in Fig. 3 in which all liquid from the engine jacket is caused to flow through the heating loops 33 and 37. This flow of fluid through the two heating loops 33 and 37 will be continued until such time as the temperature of the enclosure plus the 2° of temperature added to the thermostat is sufficient to close the thermostat contacts 101 and 102. At that time the direct circuit passing through contacts 101, 102 and which has previously been described, will cause a shunt out and therefore de-energize the solenoid 112, thereby allowing the bridging arm 111 to be moved by a spring to its normal position to close contacts 104. When this occurs the circuit for energizing solenoid 91 of the air supply valve 71 is energized, thus shifting the position of the valve core 92 so that the latter uncovers the passages 87 and 88 and permits air under pressure to flow from the source 70, through the conduit 98, valve 71, conduit 77, and retarder valve 72 to the interior of the pressure chamber 54 of the control valve 25.

The admission of air to the pressure chamber 54 will be gradual, depending upon the setting of the needle valve body 79 of the retarder 72 relative to its seat 80. Such admission of pressure to the pressure chamber will cause gradual movement of the piston 64 downwardly against the compression of spring 68 and thus move the valve body 55 of the pressure operated control valve 25 downwardly and thereby partially restrict the delivery of heating fluid to the heating loops 33, 37 and proportionately open the port for the delivery of a portion of the hot liquid to the engine cooling radiator 19. The movement of the valve body 55 will be slight because of the flow restricting function of the retarder 72 and also because the mercury column of thermostat 100 will bridge the thermostat contacts 101 and 102 only momentarily. Consequently, the air supply valve 71 is energized open only momentarily, since the energizing circuit for the auxiliary heater 116 is opened by de-energization of relay solenoid 112 and the mercury column immediately recedes away from the thermostat contact 101. As a consequence of the deenergization of relay 103 and energization of air supply valve 71, the port 89 of the air supply valve is opened to vent a portion of the air from the pressure chamber 54 of the pressure operated valve 25. The retarder 72 will partially restrain the discharge of air from the said pressure chamber 54, but there will be some air discharged and therefore the valve body 55 will be urged by spring 68 toward its former position. The cycling or recurrent closing and opening of the thermostat contacts 101, 102 and the resultant cycling of the relay 103 and the air supply valve 71 will continue, but at different rates, depending upon the temperature deflections within the enclosure 12.

It will be observed that the relative amounts of air delivered into and discharged from the pressure chamber 54 of the pressure operated valve 25 determines the adjustment of the valve body 55 and, therefore, determines the amounts of heating fluid delivered into the heating loops 33, 37 and into the engine cooling radiator 19. These amounts are proportionately varied as the rate of the cycling action of the thermostat varies. For example, assuming that the thermostat is constructed to function at a temperature of 72° and that the limiting resistor 115 supplies only sufficient current to the auxiliary heater 116 to raise the temperature of the thermostat 2° F.: When the temperature of the enclosed space of the vehicle is relatively cool, for example 70°, the full amount of auxiliary heat will be required to be applied to the mercury column of thermostat 100 to cause it to engage the upper contact 101 and thereby de-energize the relay 103. As soon as the relay is de-energized to open its contacts 105 the auxiliary heater 116 will quickly dissipate its heat. It will be apparent, therefore, that the heater 116 will require a longer period of time to raise the temperature of the thermostat 2° F. than it would require at higher temperatures. Consequently, as the temperature of the enclosed space of the vehicle rises towards 72° F. the time period during which the relay remains de-energized will progressively decrease. When the temperature of the enclosure rises to substantially 72° F. the opening and closing cycles of the relay 103 will be substantially equal. Consequently, the amounts of air supplied to the pressure operated valve and the amounts vented therefrom through the air supply valve 71 will be equal so that the valve body 55 of the control valve 25 will remain substantially stationary so as to deliver the proper amount of heated liquid to the heat radiating coils 33, 37 to maintain the said temperature of 72° F. within the vehicle. If the temperature of the enclosure 12 rises above 72° F., the closed cycle of the relay 103 will be progressively longer than the open cycle thereof and, consequently, proportionately larger quantities of heated liquid will be directed to the engine cooling radiator 19.

When the temperature of the enclosed space 12 of the vehicle stands at substantially the functional setting of the thermostat 100, the cycling action of the thermostat and, consequently, the cycling action of the air supply valve in response to minor temperature changes within the enclosure may be relatively fast. Under this condition, there will be substantially no change in the volume of air contained in the cylinder 54 of the pressure operated valve 25, since the opening and closing of the air supply valve 71 will be too fast to be reflected in changes in the volume of air within the pressure chamber 54 of the pressure operated control valve 25.

The pressure operated valve construction shown in Figs. 2, 3 and 4 is not claimed herein apart from the general system, the said valve construction per se having been divided out of the present application and constitutes the subject matter claimed in our co-pending application Serial No. 328,972, filed December 31, 1952, and now abandoned.

We claim:

1. The combination with an enclosed automotive conveyance powered with an internal combustion engine having a cooling system containing a liquid for circulating therein and including an engine radiator, a discharge conduit leading from the engine to said radiator and a return conduit leading from said radiator to the engine, of means for heating and regulating the temperature of said enclosure comprising a heat radiating element located in said enclosure and defining a closed circulating loop the inlet and outlet ends of which are connected, respectively, into said discharge and return conduits, a valve casing interposed in said discharge conduit at its junction with the inlet end of said heat radiating element and provided with a pair of spaced apart axially aligned ports one of which is positioned in the flow path of said liquid to said engine radiator and the other of which is positioned in the flow path of said liquid to said heat radiating element, a fluid pressure operated slide valve positioned in the casing and slidably movable in both of said ports during the delivery of pressure fluid thereto to progressively increase the delivery of liquid to said radiator and to commensurately reduce the delivery of liquid to said heat radiating element, and means for activating said slide valve comprising a thermostat adapted to close at a predetermined temperature within said enclosure and a pressure fluid delivery valve controlled thereby and having an energized open port for delivering the pressure fluid to said slide valve.

2. A heating and temperature control system as defined in claim 1 characterized by the provision of means for bleeding pressure fluid from said slide valve and in that the slide valve includes a spring for operating it in a direction, during the bleeding of pressure fluid therefrom, to progressively decrease the flow of hot liquid to said radiator and commensurately increase the flow of liquid through the heat radiating loop.

3. A heating and temperature control system as defined in claim 2 characterized in that the means for bleeding pressure fluid from said slide valve includes a de-energized open bleed port and by-pass duct incorporated in said pressure fluid delivery valve.

4. A heating and temperature control system as defined in claim 3 characterized in that the means for activating the pressure operated slide valve includes an air pressure line and the said pressure delivery valve is interposed in the said air pressure line.

5. A heating and temperature control system as defined in claim 4 characterized in that a flow retarding device is interposed in the air line between said pressure delivery valve and said slide valve.

6. A heating and temperature control system as defined in claim 5 characterized in that said pressure delivery valve is solenoid operated to deliver air to said pressure operated slide valve.

7. A heating and temperature control system as defined in claim 6 characterized in that the solenoid valve has an energizing circuit connected through a relay controlled by said thermostat and the thermostat is provided with an electrical heater having an energizing circuit therefor connected through energized closed contacts of said relay, whereby auxiliary heat is recurrently applied to and removed from the thermostat by the opening and closing of its contacts and thereby cycle operate the relay to recurrently open and close the delivery and bleed ports of said pressure supply valve to effect momentary movements of the slide valve in opposite directions.

8. A heating and temperature control system as defined in claim 7 characterized by the provision of means for limiting the maximum heating value of said auxiliary heater whereby the pressure fluid supply valve is cycled by the cycling of said thermostat only after the temperature of the enclosure has attained a predetermined value and the rate of the opening and closing cycles vary in relation to the differential between the temperature of the enclosure and the functional setting of the thermostat.

References Cited in the file of this patent

UNITED STATES PATENTS

| | | |
|---|---|---|
| 1,878,496 | Gulyban | Sept. 20, 1932 |
| 2,146,878 | Aubogast | Feb. 14, 1939 |
| 2,236,889 | Booth | Apr. 1, 1941 |
| 2,277,814 | Booth | Mar. 31, 1942 |
| 2,304,642 | Hans | Dec. 8, 1942 |
| 2,332,149 | Horton | Oct. 19, 1943 |
| 2,339,384 | Duckworth | Jan. 18, 1944 |
| 2,401,004 | Lehane | May 28, 1946 |
| 2,482,735 | Ritter | Sept. 20, 1949 |
| 2,522,313 | Smith | Sept. 12, 1950 |
| 2,576,246 | Taylor | Nov. 27, 1951 |
| 2,706,085 | Nallinger | Apr. 12, 1955 |

FOREIGN PATENTS

| | | |
|---|---|---|
| 994,754 | France | Aug. 8, 1951 |